P. INGOLD.
ARTIFICIAL LEG.
APPLICATION FILED AUG. 4, 1917.

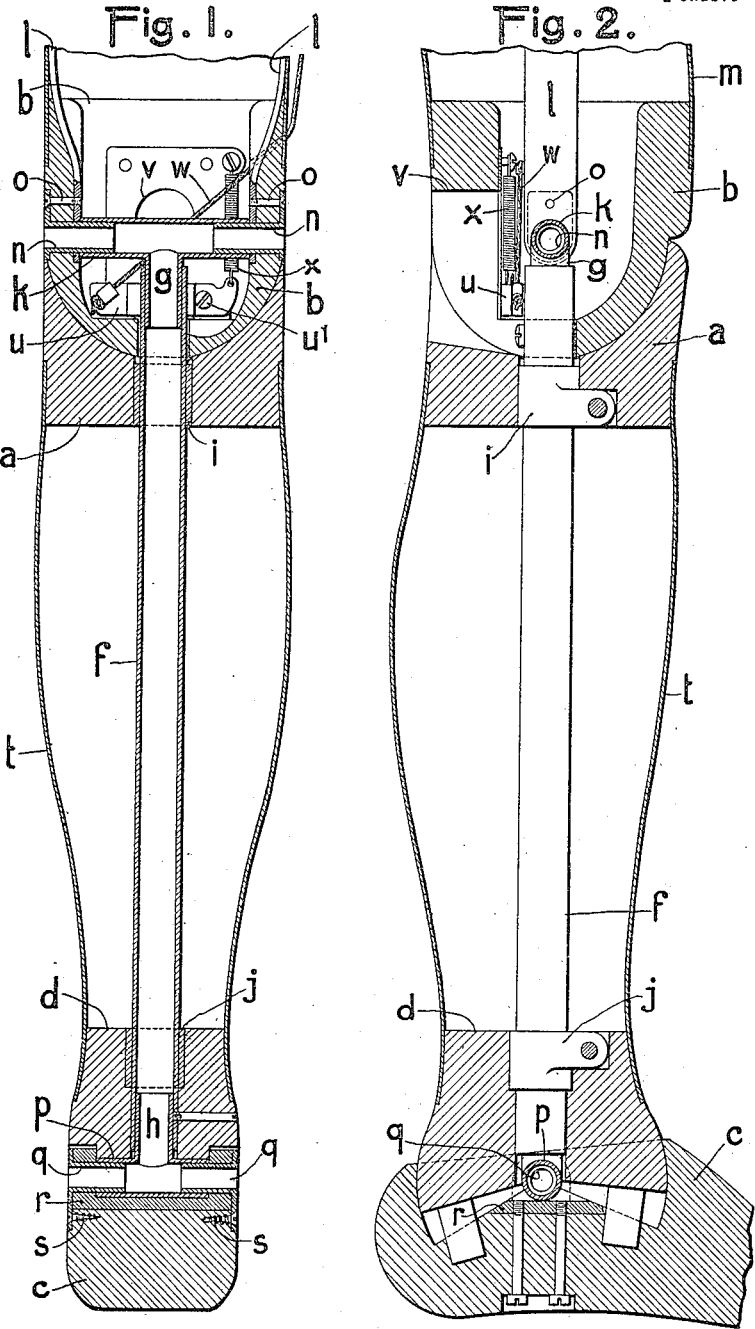

1,281,165.

Patented Oct. 8, 1918.
2 SHEETS—SHEET 2.

Inventor.
Paul Ingold.
by Wilkinson & Giusta
Attorneys.

UNITED STATES PATENT OFFICE.

PAUL INGOLD, OF BASEL, SWITZERLAND.

ARTIFICIAL LEG.

1,281,165.  Specification of Letters Patent.  Patented Oct. 8, 1918.

Application filed August 4, 1917. Serial No. 184,517.

*To all whom it may concern:*

Be it known that I, PAUL INGOLD, a citizen of the Swiss Republic, and resident of Basel, Switzerland, have invented new and useful Improvements in Artificial Legs, of which the following is a full, clear, and exact specification.

The principal purpose of the present invention consists in providing for artificial legs the possibility of an exact longitudinal adjustment and positioning of the joints thereof. For this purpose in the present invention the knee joint and the foot joint of the leg are connected together my means of a central telescoping tubular frame-work which is so arranged that it allows of independent relative longitudinal and angular adjustments thereof in such a manner that before the application of the covering parts adjustment can be made for the joints by drawing out or pushing in the tubular frame-work or relatively turning its parts and the fixing thereof in regard to the relative distance apart of the joints and to the right relative angular position thereof whereby the longitudinal and angular adjustments of the leg can be effected independently of each other, that is to say without interfering with one another. The wearer will test the leg without the covering parts and detect any inaccuracies in the length and angular position of the joints whereupon these errors can be corrected by altering the relative position of the members of the tubular frame-work. After the leg has been adjusted in this manner the covering parts are applied.

In the accompanying drawings:

Figures 1 and 2 illustrate an embodiment of the invention in two longitudinal sections in planes at right angles one to the other and show the lower part of the leg;

In Figs. 1 and 2, $a$ illustrates the socket and $b$ the rotating head of the knee joint of the illustrated artificial leg, while $c$ illustrates the socket and $d$ the rotating head of the foot joint. From the knee joint to the foot joint there extends centrally or axially a steel tube $f$ which is fitted over a tube $g$ in the knee joint head $b$ and over a tube $h$ in the foot joint head $d$ and forms with these parts the above mentioned tubular frame-work. In the knee joint socket $a$ and in the foot joint head $d$ the tube $f$ passes through the tube clamp-holders $i$ and $j$ located in the respective parts and capable of being clamped fast from the outside. The tube $g$ is rigidly attached to a horizontal hinge tube $k$ which can revolve in the knee joint head $b$ between the inwardly bent metallic bars $l$ of the stump socket $m$ upon two hollow pivots $n$. These are inserted removable from the outside in the knee joint head $b$ and secured upon it by means of a flange and a screw $o$. In like manner the tube $h$ is rigidly connected with a horizontal hinge tube $p$, which can revolve in the foot joint socket $c$ upon two hollow pivots $q$. These latter are held in a bearing $r$ fixed in the foot joint socket $c$, in which they are inserted removable from the outside being fixed by means of a flange and a screw $s$ to the foot joint socket $c$.

The letter $t$ indicates the envelop of fiber, stiff leather or the like connecting the knee joint with the foot joint.

On testing the artificial leg which should be done before the application of this envelop, the tube clamp holders $i$, $j$ are loosened. The correct distance between the knee joint and the foot joint is exactly adjusted by pulling out or pushing in the tubular frame-work composed of the tubes $f$, $g$ and $h$, and then independently of this lengthening or shortening operation, there is effected a relative angular adjustment of the parts of the frame-work for correct setting of the foot, after which the clamp-holders $i$, $j$ are clamped up firmly so as to hold fast the tubes. Hereby the leg is adjusted as regards its length and the position of the joints and the envelop $t$ can then be secured in place.

If the hinge connection in one of the joints requires to be altered or mended, it suffices to draw out to the outside the respective hinge pivots $n$ or $q$ after releasing the corresponding fastening screws, whereby the joint connection is released. The members of the tubular frame-work are also relatively revoluble about their longitdinal axis; and therefore it is also possible to adjust the foot for the most convenient walking at the correct oblique position. It is advantageous for this purpose to fix the position when thus adjusted by means of set screws or the like.

Figure 5:
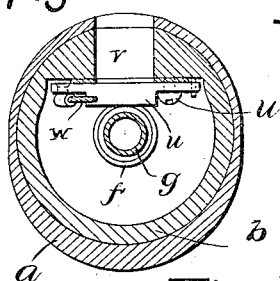
Fig. 5 shows a detail view of a lock device arranged in the knee-joint of the first construction, said view being a horizontal section of Fig. 1.

In order to lock the knee joint in the straight position of the leg, a lock $u$ is pivotally arranged in the knee head $b$ transversely to the rear slot $v$ thereof, (Fig. 5) so as to form a rear transverse stop in the knee head $b$ for the upper end of the tubular framework. The lock $u$ is pivoted at $u^1$ and on the other end thereof is attached a flexible traction member $w$ extending upward for its operation by hand, so that on pulling upon said traction member, the lock $u$ can be turned up against the action of a retracting spring $x$, in order to free the slot $v$ and to allow the upper end of the tubular framework to slide therein. A fastening device allows fastening of the flexible traction member $w$ when having been pulled. When the latter is disengaged, the lock $u$ falls down to its bridging or locking position.

Figure 3:
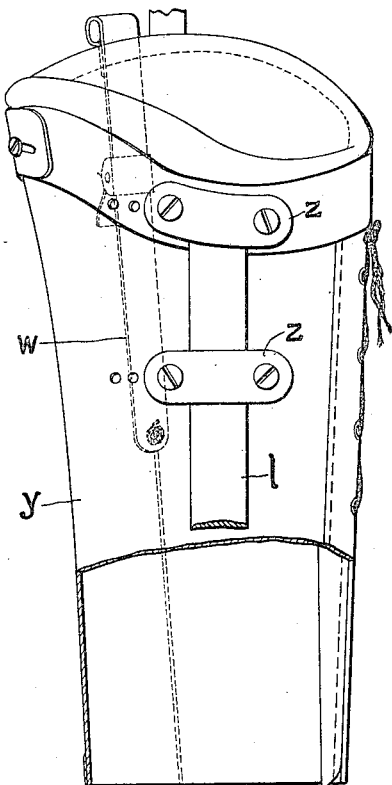
Figs. 3 and 4 represent in similar sections the upper part of a second embodiment of the invention.
Figure 4:
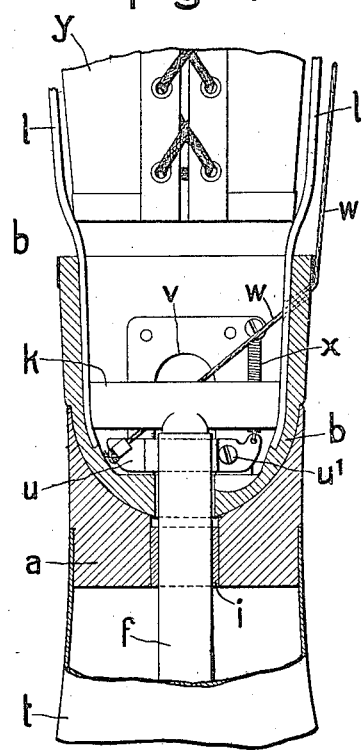

Figs. 3 and 4 show the upper part of a second embodiment of the invention wherein the same locking device is employed in the knee joint. The metallic bars $l$ are here adjustably connected with the stump socket $y$ so that the latter can be angularly displaced or turned within certain limits with regard to the bars $l$ and to the tubular frame-work of the lower part of the leg, in order to allow of exact adjustment thereof to the stump. This adjustment is made possible by the fact that the fastening strips $z$ for said bars $l$ can be fixed at different points to the stump socket $y$.

From the foregoing specification the following advantages may be gathered in regard to the artificial leg described:

1. The length of the leg is easily and exactly adjustable even after construction and long use thereof.

2. The joint connections are easily released and the hinged parts in the joints are adjustable, revolubly, visibly and interchangeably.

3. The foot can be brought into the correct angular position. This angular adjustment is wholly independent of the longitudinal adjustments of the legs and can be effected without interfering therewith.

4. The tubular frame-work and the hinge parts of the leg can be constructed in factories on a large scale, inasmuch as for these parts the workmen are not bound to exact longitudinal measure, therefore by aid of this tubular system and its revolubility and adjustability it becomes possible to construct all parts of the artificial leg interchangeable. Finally the leg itself is durable, handsome in appearance and cheap in construction.

What I claim is:

1. In an artificial leg, a knee-joint, a foot joint and a central telescoping tubular frame-work adjustably connecting said joints with one another and arranged to allow of independent relative longitudinal and angular adjustments of its parts, in combination with fixing means, substantially as and for the purpose described.

2. In an artificial leg, a knee-joint, a foot joint, a tube belonging to said knee joint, a tube belonging to said foot joint, a central telescoping tube slidably and rotatably connected with both said tubes for independent longitudinal and angular adjustments and means for fixing the telescoping tube in its adjusted position, substantially as and for the purpose described.

3. In an artificial leg a knee joint having a horizontal hinge tube pivotally mounted upon removable hinge pivots, a foot joint having also a horizontal hinge tube pivotally mounted upon removable hinge pivots, each of said hinge tubes being provided with a transverse connecting tube, a central telescoping tube slidably and rotatably connected with the transverse connecting tubes of said hinge tubes for independent longitudinal and angular adjustments of the leg, and means for fixing the telescoping tube in its adjusted position, substantially as and for the purpose described.

4. In an artificial leg, a knee joint, a foot joint, a central adjustable telescoping tubular frame-work for independent longitudinal and angular adjustments of the same, a falling down transverse lock to lock the knee joint in the straight position of the leg and hand operated means for releasing said lock, substantially as and for the purpose described.

In witness whereof I have hereunto signed my name this 10th day of July, 1917, in the presence of two subscribing witnesses.

PAUL INGOLD.

Witnesses:
JULIA DÜRST,
AMAND BRAUN.